March 7, 1961

R. E. BAILEY 2,973,689

APPARATUS FOR PROJECTING SLIDES

Filed Oct. 23, 1957

INVENTOR.
RALPH E. BAILEY
BY
ATTORNEYS

March 7, 1961 R. E. BAILEY 2,973,689
APPARATUS FOR PROJECTING SLIDES
Filed Oct. 23, 1957 3 Sheets-Sheet 2

INVENTOR.
RALPH E. BAILEY
BY
Moore, White & Burd
ATTORNEYS

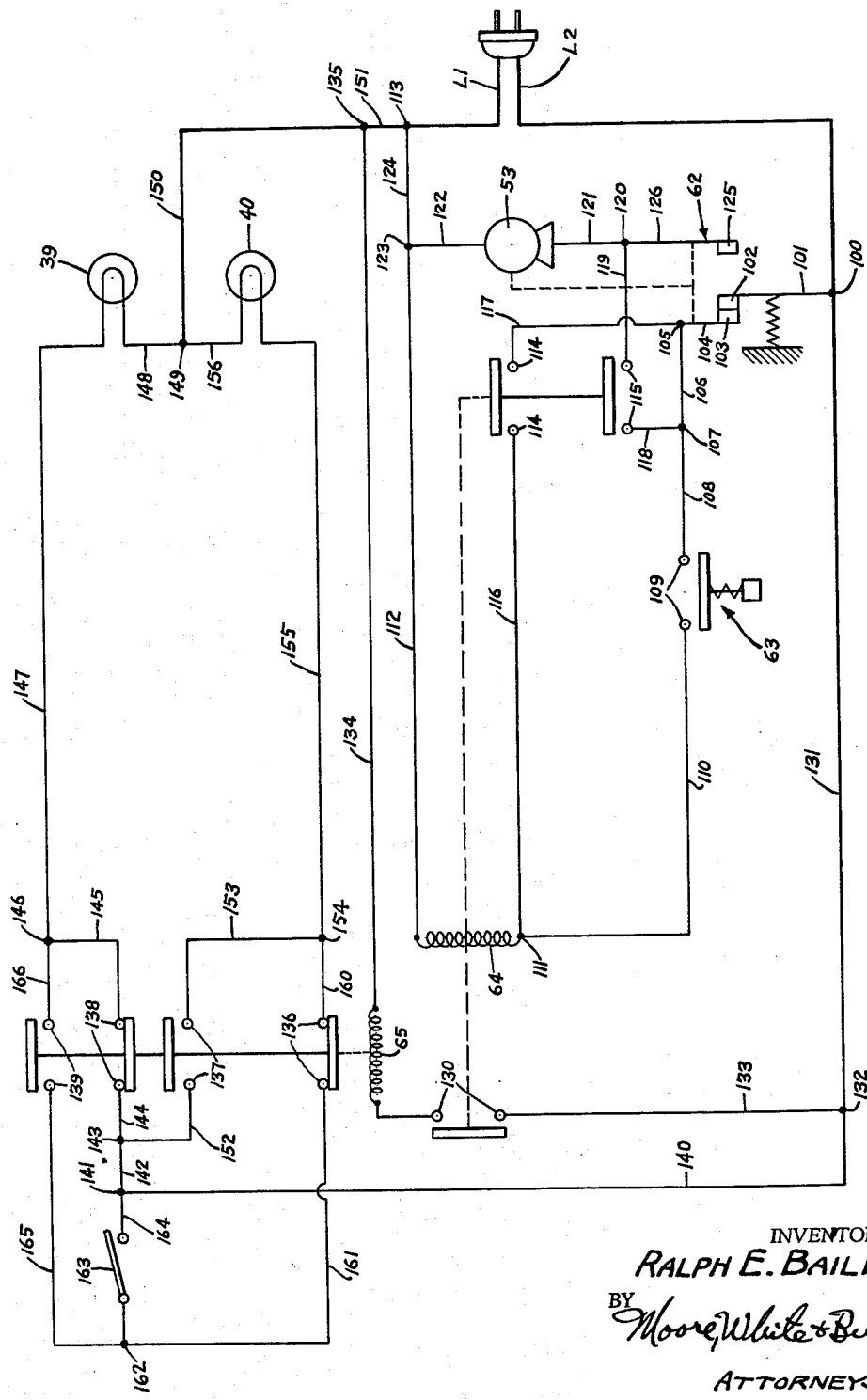

United States Patent Office 2,973,689
Patented Mar. 7, 1961

2,973,689
APPARATUS FOR PROJECTING SLIDES
Ralph E. Bailey, Lincoln County, S. Dak.
(Rte. 1, Box 376, Sioux Falls, S. Dak.)
Filed Oct. 23, 1957, Ser. No. 691,884
2 Claims. (Cl. 88—28)

This invention concerns new and useful improvements in an apparatus for projecting slides. More particularly it concerns new and useful improvements in an apparatus for alternately moving slides from a single rack to twin projecting lenses located respectively to the right and left of the rack whereby the image from the slides may be alternately projected through one of the lenses for viewing.

Heretofore, when using a projector employing twin lenses it has been necessary to provide each lens with a separate rack to hold the slides that are to be projected by each of the lenses. The projectionist is thus required to select the slides to be projected into separate groups where they are then placed into the corresponding rack for each of the lenses. Care must be taken to see that the slides in each of the groups are in a specific order so that each slide will be viewed in its proper sequence from one or the other of the alternate lenses. This is usually done by grouping the slides to be projected by one of the lenses in the sequence of 1, 3, 5, 7, 9, etc., and by grouping the slides to be projected by the other lens in the sequence of 2, 4, 6, 8, 10, etc. Only by using special care to compile two separate groups of slides may they be alternately projected by twin lenses in a specific sequential relationship.

It is to this problem of alternately feeding slides to twin projectors that my invention is directed. Broadly speaking, my invention comprises new and useful improvements in an apparatus for feeding slides from a single column alternately into left and right projectors where the image of the slide through first one and then the other of the projectors may be viewed or transmitted to a camera for televising and the like.

It is therefore an object of my invention to provide new and useful improvements in an apparatus for efficiently projecting slides alternately from twin projecting lenses.

It is a further object of my invention to provide a new and useful apparatus for projecting slides into a television camera or the like.

A further object of this invention is to provide a new and useful apparatus for feeding slides from a single rack alternately into right and left projecting lenses.

A further object of this invention is to provide means for placing slides grouped in a sequential relationship into a single column and automatically removing the slides from the column to projecting lens means.

Still a further object of this invention resides in the provision of means for automatically removing slides from a single column.

Still a further object of this invention resides in the provision of means for retaining slides in a single magazine, means for automatically removing the slides from the magazine in alternate sequence to a position for projection by right and left positioned lenses and means for removal of the slides from the projection position.

Still a further object of this invention resides in the provision of means for alternately illuminating projection lamps which cooperate in a sequential relationship with means for automatically placing the slides in position for alternate projection by right and left disposed lenses.

Other and further objects of this invention reside in the structural details of the slide retaining means, the means for automatically removing slides from a single column and alternately placing them before right and left disposed lenses for projection, the structural combination of slide retaining and projecting means and in the sequential circuit controls therefor.

Still other and further objects of this invention are inherent and apparent in the apparatus as described, pictured and claimed.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

This invention will be described with reference to the drawings, illustrating an exemplary form of apparatus, in which corresponding numerals refer to the same parts and in which:

Figure 4 is a wiring diagram showing an explary form of electrical circuitry connections for my invention.

Figure 1:
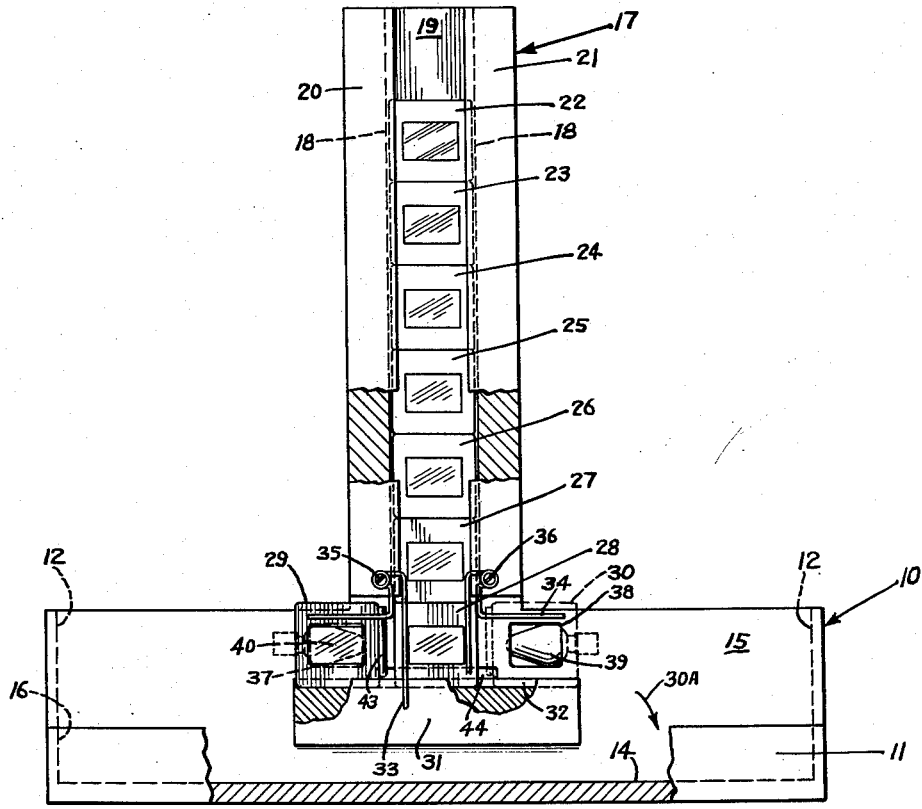
Figure 1 is a front elevational view of the apparatus for projecting slides partly in section and showing the slides in position for projection.
Figure 2:
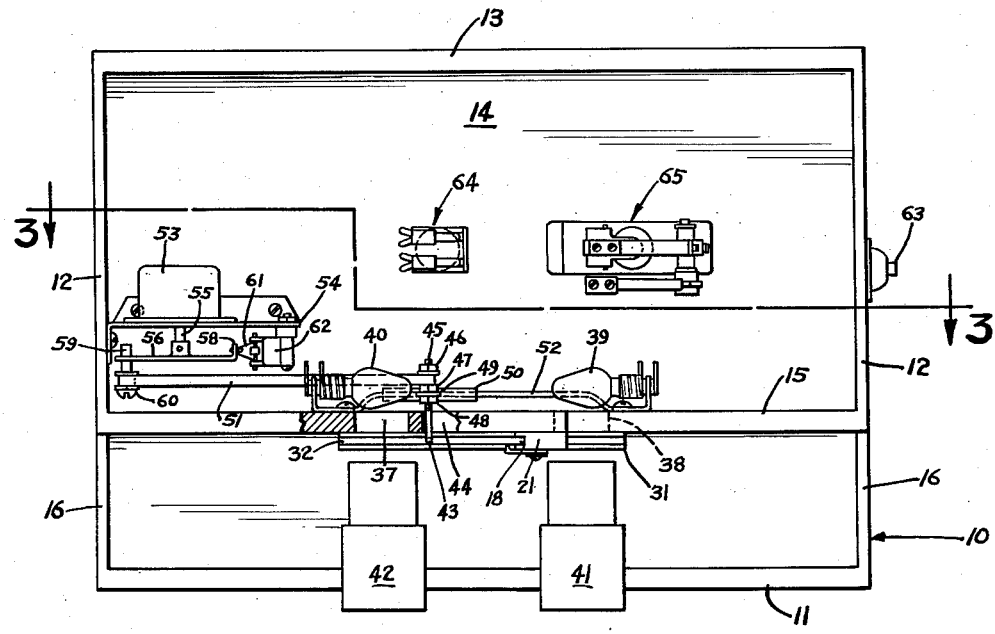
Figure 2 is a top plan view thereof showing the details of the projector lamps and lenses and the means for moving alternate slides into position for projection.

Referring now to the drawings and particularly to Figures 1 and 2, the form of apparatus shown therein comprises a rectangular box shaped frame generally designated 10, comprising front wall 11, side walls 12, a rear wall 13 and a bottom 14. A vertical supporting member 15 transversely bisects frame 10 about one-third of the distance from front wall 11 to rear wall 13. Supporting member 15 is shown of the same height as side walls 12 and somewhat higher than front wall 11 and the side wall portions 16 which extend from member 15 to front wall 11, best shown in Figure 2, and are of the same height as front wall 11. It can thus be seen that a tray-like member formed by bottom 14, walls 11 and portions 16 is positioned directly in front of supporting member 15 to form a receptacle for slides that are ejected after projection.

Supported midway along supporting member 15 is vertical rack 17 into which a plurality of slides may be inserted. Vertical grooves 18 form edge boundaries for channel 19 in which the slides move vertically. Grooves 18 are formed by a cut along the oppositely disposed intermediate faces of edge pieces 20 and 21.

It is to be understood that rack 17 may be adapted to fit slides of any size or any combination of sizes that are suitable for projection.

In use, a plurality of slides 22–30 are inserted in the grooves 18 of the rack 17 to form a column. As shown in Figure 1, slides 22 through 27 are in a position to fall vertically downward along rack 27 while slide 28 is in a ready position to be laterally moved for projection. Slide 30 is being projected and slide 29 will next be projected as hereinafter described. After slide 30 is projected, slide 28 will be moved laterally into the position of slide 30, forcing slide 30 outwardly to the right with reference to Figure 1 and into bottom 14 in the area formed by walls 11 and 16 as shown by arrow, Attached to the front side of supporting member 15 in spaced relation to the lower terminus of edge pieces 20 and 21 is horizontal plate 31. The top surface of plate 31 has a transverse groove 32 into which the bottom surface of the slides drop onto after leaving groove 18. A pair of resilient wire retainers 33 and 34 of the configuration shown are fastened onto the lower portion of the edge pieces 20 and 21 by screws 35 and 36, which hold the slides in vertical position when dropping from the grooves 18 of rack 17 into groove 32 and also during their lateral movement along groove 32. Member 15 has spaced projection apertures 37 and 38 above plate 31 as shown. These allow illumination to pass from projection bulbs 39 and 40 to twin projecting lenses 41 and 42. The lenses 41 and 42 are suitably mounted on front wall 11 in spaced alignment with the projection bulbs and apertures 37 and 38. In a horizontal spaced relation extending over the front surface of supporting member 15 are two horizontal rod members, not shown in the drawings, located immediately above and immediately below apertures 39 and 40 which serve as guides against which slides 29, 28 and 30 may move leftwardly and rightwardly so that they do not slide flush with the surface of supporting member 15.

Figure 3:
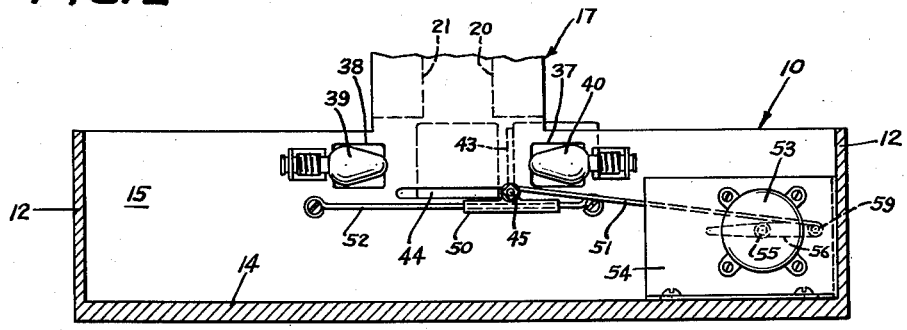
Figure 3 is a fragmentary sectional view taken along the line and in the direction of the arrows 3—3 of Figure 2.

The lower portion of an L-shaped vertical pusher bar 43 shown in position between slides 29 and 28 penetrates an elongated horizontal slot 44 in member 15 as best shown in Figure 3. Slot 44 is positioned flush with the top intermediate surface of plate 31. When actuated, vertical pusher bar 43 moves the slides alternately leftwardly and rightwardly along groove 32.

The lower L-shaped end of the pusher bar 43 penetrates slot 44 and threaded shank 45 receives nuts 46, 47 and 48 which secure the pusher bar to ear 49 of extension sleeve 50, and to connecting rod 51. Extension sleeve 50 is mounted for reciprocal motion along rider bar 52 secured to the inner surface of supporting member 15 immediately below slot 44 as shown in Figure 3. The leftward limit of the motion of bar 43 is between slides 29 and 28 while the rightward extension is between slides 28 and 30 as shown in Figure 1. Extension sleeve 50 acts as a stabilizer and guide for pusher bar 43 during its lateral leftward and rightward motion.

The pusher bar is actuated by motor 53 supported on mounting 54 in spaced relation to supporting member 15. Shaft 55 rotates crank arm 56. One end of crank arm 56 is L-shaped forming tip 58 while the other end is apertured to receive shank 59 of screw 60 which is secured to crank shaft 51. As crank arm 56 rotates with shaft 55 tip 58 and shank 59 will alternately engage actuator 61 for microswitch 62. When tip 58 or shank 59 engages actuator 61, the microswitch 62 breaks the circuit and the motor stops in this position until reactivated by pushing switch 63.

Reference is now made to the circuit shown in Figure 4. In this figure there is shown a schematic wiring diagram illustrating one form of circuitry for the operation of the invention. A control circuitry is provided in which lines L-1 and L-2 are the power lines connected to any convenient source of electric current. On actuation of the start button or switch 63, a circuit will be established from juncture 100 on line L-2 via line 101, contacts 102 and 103 of the switch 62 via line 104 through juncture 105, line 106 through juncture 107 and line 108 to the contacts 109 which are momentarily closed as the switch 63 is energized. The circuit will continue via line 110 and juncture 111 through the coil of relay 64 and via line 112 to juncture 113 on line L-1. This will actuate relay 64 which then operates to close contacts 114 and 115. The closure of contacts 114 establish a shunt or holding circuit via line 117 through contacts 114 and via line 116 to juncture 111, thus serving to hold relay 64.

The closure of contacts 114 and 115 establishes a circuit via line 118 to juncture 107 and line 119 to juncture 120 and thence via line 121 to motor 53 which is in turn connected by line 122 to juncture 123 and thence via line 124 to juncture 113.

Thus, momentary actuation of switch 63 will establish a holding circuit for relay 64 and start the electric motor 53.

As motor 53 commences to rotate, it moves tip 58 of arm 56 downward and away from actuator 61 of switch 62. Actuator 61 then moves under spring bias to connect contacts 102 of switch 62 to contact 125. This establishes a circuit from line 101, through contacts 102 and 125 and via line 126 to contact 120 and thence to motor 53 which continues to run.

Motor 53 thus operates on an independent shunt circuit revolving shaft 55 180° or one-half a revolution until shank 59 strikes actuator 61 which in turn actuates switch 62 to break contacts 102 and 125 stopping the motor. It is thus readily seen that the independent shunt circuit established through contacts 102 and 125 cuts out switch 63 and allows motor 53 to operate free of any danger of reversal by accidently engaging switch 63.

Reenergization of the circuit will cause the same functions except that the alternate lamp is illuminated as hereinafter described. Shank 59 leaves actuator 61 which connects contacts 102 and 125 to establish the shunt circuit. The motor moves one-half of a revolution until tip 58 engages actuator 61 to break the circuit to the motor.

Energization of relay 64 also closes contacts 130. The closure of these contacts establishes a circuit via line 131 to juncture 132 and line 133 through contacts 130 to the coil of relay 65 and then via line 134 to juncture 135 on line L-1. This energizes the coil of relay 65 closing contacts 136, opening contacts 137, closing contacts 138 and opening contacts 139.

At this time when lines L-1 and L-2 have been connected to a source of electric current, there has been a circuit established from juncture 132 via line 140, juncture 141 and then via lines 142, juncture 143, line 144 and closed contacts 138 to line 145 to juncture 146 and thence via line 147 to the lamp 39 and from thence via line 148 and juncture 149 to line 150 which is connected to juncture 135 via line 151 to juncture 113 of line L-1. Lamp 39 is thus lighted. Since contacts 137 are open, lamp 40 is not lighted at this time.

However, as contacts 138 are opened, the just previously discussed circuit is broken and lamp 39 is extinguished. Closure of contacts 137 establishes a circuit via line 152 from juncture 143 via line 153 to juncture 154 thence via line 155 through lamp 40 and line 156 to juncture 149. At this time lamp 40 becomes lighted.

Switch 163 allows both lamps to be illuminated simultaneously if it is desired to superimpose the images of two slides. It will be noted that contacts 136 are closed when contacts 139 are open and vice versa. When contacts 138 and 136 are closed, lamp 39 is illuminated and if switch 163 is engaged, a circuit will be established via line 140 to juncture 142 thence through line 164 to the switch 163 and via line 161 to closed contacts 136 and thence to juncture 154 via line 160 and through line 155 to lamp 40. This thus permits simultaneous lighting of lamp 40 for superimposing two slides.

Likewise, when contacts 137 are closed, contacts 139 are also closed. This will permit a circuit to be established from juncture 141 via line 164 and switch 163 to juncture 162 and through line 165 to closed contacts 139 and thence to line 166 and juncture 146 and to line 147 thus permitting simultaneous lighting of lamp 39 with lamp 40 again permitting superimposing of images.

It will also be noted from the above explanation that when actuator 61 of switch 62 engages contacts 102 and 125 providing a shunt circuit for motor 53 the relays 64 and 65 are deenergized and current will constantly pass through line 140 to energize either or both lamps 39 and 40 without danger of reversing or extinguishment by accidently engaging switch 63.

Operation of the projector may be best illustrated by referral to Figure 1 where slides have already been loaded by inserting them into channel 19 and grooves 18. The first slide placed in the rack will drop to the position of slide 28.

Slide 30 is being projected as notch relay 65 (Figures 2 and 4) has been set to allow current to pass continually to lamp 39. Upon actuation of switch 63, current will be fed to the motor 53 which rotates crank arm 56 and tip 58 as shown in Figure 2, and lamp 39 will be extinguished and lamp 40 illuminated. As tip 58 leaves contact 61 of microswitch 62 a shunt circuit is formed to the motor via contacts 102 and 125 of switch 62. Crank shaft 51 through shank 45 pushes pusher bar 43 along extension sleeve 50 through elongated slot 44. Pusher bar 43 pushes the vertical side of slide 28 rightwardly along groove 32. Slide 28 also pushes slide 30 rightwardly along groove 32 until the latter falls from plate 31 onto bottom 14 of frame 10. Pusher bar 43 will move rightwardly until it reaches the dotted line position shown in Figure 1. Slide 28 will then be in alignment with projection aperture 38 and lens 41 for projection. Slide 27 will fall by gravity into the space vacated by slide 28 and will be held in its vertical position by wire retainers 33 and 34. As crank arm 56 of motor 53 nears completion of a 180° rotation, shank 59 will now engage and push down pivotal actuator 61 returning microswitch 62 to the position of Figure 4 which stops the motor 53. Crank shaft 51 together with crank arm 56 will be at its greatest extension thus holding the pusher bar at the dotted line position of Figure 1. When button switch 63 is again actuated, lamp 39 will light and slide 28 will be projected while the pusher bar pushes slide 27 leftwardly into the position of slide 29 while the latter drops to the left hand side of plate 31 onto bottom 14. The motor will again rotate 180° until tip 58 actuates pivotal actuator 61 again shutting off current to the motor. The motor will stop when the crank shaft and pusher bar are again in the position shown in Figure 1. In the meantime, slide 26 will have fallen from rack 17 to the position vacated by slide 27.

As many widely differing embodiments of this invention may be provided without departing from the spirit and scope thereof, it is to be understood that I do not specifically limit myself to the embodiments disclosed herein.

What I claim is:

1. In combination, an elongated rectangular vertical rack having slide edge embracing grooves for supporting a column of vertically positioned slides, a horizontally grooved plate positioned below and in spaced relation to said rack, a pair of wire guides depending from said rack near said plate, a pusher means having a portion thereof extending into the area above said plate and below said rack mounted for horizontal reciprocating motion adjacent to said plate, means connected to said pusher means for reciprocating it leftwardly and rightwardly, dual projectors secured at left and right of said vertical rack, and a switch mechanically linked to the mechanism for actuating said pusher assembly for actuating said projectors alternately in cooperation with said pusher bar.

2. The combination of claim 1 in which a circuit altering manually controlled switch means is provided for connecting at will portions of the projector control circuits normally disconnected, whereby said projectors may be illuminated simultaneously and alternately selectively.

References Cited in the file of this patent

UNITED STATES PATENTS

| | | |
|---|---|---|
| 541,188 | Tournier | June 18, 1895 |
| 1,365,723 | Patterson | Jan. 18, 1921 |
| 2,260,660 | Darwin | Oct. 28, 1941 |
| 2,503,239 | Antos | Apr. 11, 1950 |
| 2,586,611 | Cadwell et al. | Feb. 19, 1952 |

FOREIGN PATENTS

| | | |
|---|---|---|
| 23,495 | Great Britain | of 1897 |